United States Patent
Dobler

(10) Patent No.: US 8,638,226 B2
(45) Date of Patent: Jan. 28, 2014

(54) METHOD AND DEVICE FOR DETERMINING A LEAK IN A SYSTEM COMPONENT AND/OR FOR DETERMINING A STATE OF A SYSTEM COMPONENT

(75) Inventor: Thomas Dobler, Hatzenbühl (DE)

(73) Assignee: Siemens Aktiengesellschaft, Munich (DE)

(*) Notice: Subject to any disclaimer, the term of this patent is extended or adjusted under 35 U.S.C. 154(b) by 616 days.

(21) Appl. No.: 12/919,046

(22) PCT Filed: Feb. 10, 2009

(86) PCT No.: PCT/EP2009/051497
§ 371 (c)(1),
(2), (4) Date: Aug. 24, 2010

(87) PCT Pub. No.: WO2009/106421
PCT Pub. Date: Sep. 3, 2009

(65) Prior Publication Data
US 2010/0328067 A1    Dec. 30, 2010

(30) Foreign Application Priority Data
Feb. 25, 2008 (DE) .................. 10 2008 010 853

(51) Int. Cl.
*G08B 21/00* (2006.01)
*G08B 5/36* (2006.01)
*G01D 7/00* (2006.01)
*G01L 1/24* (2006.01)
*G01N 29/04* (2006.01)

(52) U.S. Cl.
USPC ... 340/540; 340/619; 340/815.5; 340/815.54; 340/815.57; 73/587; 73/800; 73/801

(58) Field of Classification Search
None
See application file for complete search history.

(56) References Cited

U.S. PATENT DOCUMENTS

| | | | | |
|---|---|---|---|---|
| 4,134,290 A | * | 1/1979 | Bauerle | 73/40.5 R |
| 4,172,382 A | | 10/1979 | Murphy et al. | 73/40.5 |
| 4,457,163 A | * | 7/1984 | Jackle | 73/40.5 A |
| 4,609,994 A | * | 9/1986 | Bassim et al. | 702/39 |
| 4,857,261 A | * | 8/1989 | Marshall et al. | 376/248 |
| 4,858,462 A | * | 8/1989 | Coulter et al. | 73/40.5 A |
| 5,005,005 A | * | 4/1991 | Brossia et al. | 340/604 |

(Continued)

FOREIGN PATENT DOCUMENTS

| | | | | |
|---|---|---|---|---|
| DE | 2414204 | | 10/1975 | F17D 5/06 |
| DE | 3013465 | | 10/1981 | F17D 5/06 |

(Continued)

OTHER PUBLICATIONS

International Search Report and Written Opinion for Application No. PCT/EP2009/051497 (15 pages), Apr. 28, 2009.

*Primary Examiner* — George Bugg
*Assistant Examiner* — Renee Dorsey
(74) *Attorney, Agent, or Firm* — King & Spalding L.L.P.

(57) ABSTRACT

In a method and a device for determining a leak in at least one system component (2.1 through 2.*n*) and/or a state of a system component (2.1 through 2.*n*) of a system, at least one section of one or more system components (2.1 through 2.*n*) is monitored optically. Sound emissions occurring in or on at least one of the system components (2.1 through 2.*n*) are detected, analyzed and localized, wherein acoustically localized sound emission areas of the affected system component (2.1 through 2.*n*) are also optically detected and analyzed.

16 Claims, 1 Drawing Sheet

(56) References Cited

U.S. PATENT DOCUMENTS

| | | | |
|---|---|---|---|
| 5,442,826 A * | 8/1995 | Murata et al. | 15/3.51 |
| 5,979,239 A | 11/1999 | Youngquist et al. | 73/584 |
| 6,385,558 B1 | 5/2002 | Schlemm | 702/182 |
| 6,484,564 B1 * | 11/2002 | Hayashida | 73/40 |
| 6,725,705 B1 * | 4/2004 | Huebler et al. | 73/40.5 A |
| 2003/0079519 A1 * | 5/2003 | Wilkinson et al. | 73/23.2 |
| 2006/0191341 A1 * | 8/2006 | Olesen et al. | 73/592 |

FOREIGN PATENT DOCUMENTS

| | | | |
|---|---|---|---|
| DE | 19528287 | 2/1997 | G01M 3/24 |
| EP | 0961189 | 12/1999 | G05B 23/02 |
| EP | 1236983 | 9/2002 | G01M 3/02 |
| EP | 1371962 | 12/2003 | G01M 3/24 |
| GB | 2382140 | 5/2003 | G01M 3/24 |
| WO | 2004090498 | 10/2004 | G01M 3/24 |

* cited by examiner

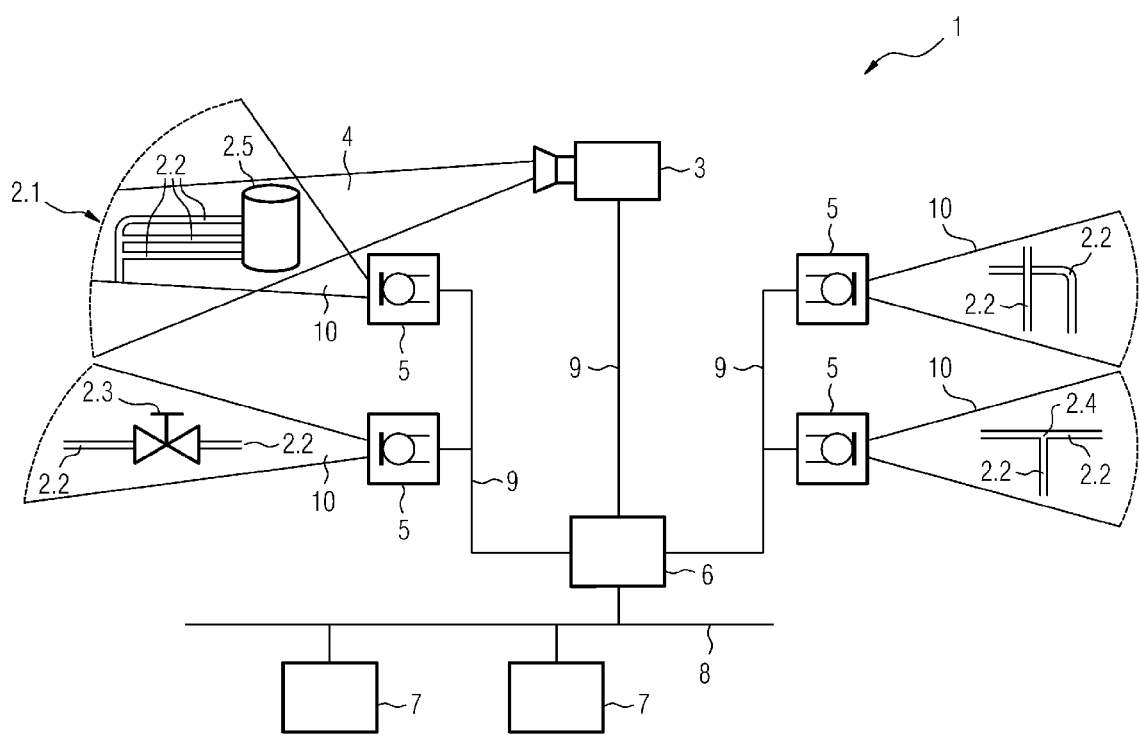

METHOD AND DEVICE FOR DETERMINING A LEAK IN A SYSTEM COMPONENT AND/OR FOR DETERMINING A STATE OF A SYSTEM COMPONENT

CROSS-REFERENCE TO RELATED APPLICATIONS

This application is a U.S. National Stage Application of International Application No. PCT/EP2009/051497 filed Feb. 10, 2009, which designates the United States of America, and claims priority to DE Application No. 10 2008 010 853.7 filed Feb. 25, 2008. The contents of which are hereby incorporated by reference in their entirety.

TECHNICAL FIELD

The invention relates to a method and an apparatus for determining a leak in at least one installation component and/or a state of at least one installation component of an installation, in particular in a pipeline, an assembly, a fitting, a vessel, etc. of a pipeline network, for example an oil or gas installation or a chemical installation or a pumping station.

BACKGROUND

In industrial installations such as oil, gas or chemical installations, there is the need to identify leaks or a leakage in an installation component of the installation and states of the installation component as quickly and reliably as possible in order to be able to take suitable measures to eliminate the leak or leakage or faulty states of the installation component. Here, in the context of the invention, a leak is understood in particular to mean an unsealed, faulty point in a wall of a pipeline, a vessel, etc. A leakage is in particular a loss of the medium transported in the installation component, for example by evaporation or seepage.

Monitoring methods for process parameters which are known from the prior art, such as measurement of the pressure drop, measurement of changes in temperature, detection of developments of steam or smoke arising, in or at the installation components are very complex and are usually sluggish and imprecise in certain environments, in particular outdoors. It is known here to use optical recording units, such as cameras, for example, for monitoring the installation components, which, in particular, are arranged outdoors and which are continuously observed by a user. In addition, the optically detected data of the installation component are combined with data detected by measurement technology relating to pressure drop, changes in temperature and are used for determining a risk region.

SUMMARY

According to various embodiments, a method and an apparatus for determining a leak and/or a state of at least one installation component can be specified which makes it possible, in a simple manner, to monitor installation components of the installation which may not be visible in a safe, quick, automatic and dynamic manner.

According to an embodiment, in a method for determining a leak in at least one installation component and/or a state of at least one installation component of an installation, at least a subregion of one or more installation components being monitored optically, noise emissions occurring in or at at least one of the installation components are detected, analyzed and located, wherein acoustically localized noise emission regions of the installation component in question are additionally detected optically and analyzed.

According to a further embodiment, the point of origin of the noise emissions can be determined using analysis of at least one parameter of the noise emissions and is detected optically and analyzed. According to a further embodiment, at least one parameter of the noise emissions can be detected and analyzed and used for adapting the optical detection of the acoustically located noise emission region. According to a further embodiment, as parameter of the noise emissions, at least a frequency, a frequency band, an intensity and/or an amplitude of sound waves of the noise emissions can be determined and analyzed. According to a further embodiment, changes in the at least one parameter of the sound waves can be determined and analyzed. According to a further embodiment, as changes in the parameter, changes in a frequency, a frequency band, an intensity and/or an amplitude of the detected sound waves can be determined. According to a further embodiment, at least a newly arriving frequency and/or frequency band and/or at least a lapsed frequency and/or frequency band can be determined in the detected sound wave range. According to a further embodiment, detected changes in at least one of the parameters of the detected sound waves can be monitored for an overshoot and/or undershoot of at least one predeterminable threshold value. According to a further embodiment, a time profile of changes in at least one parameter of the detected sound waves can be determined and can be monitored for an overshoot and/or undershoot of a predeterminable threshold value. According to a further embodiment, a detected change in the frequency band of the sound waves can be identified as a change in a rotation speed of an installation component, in particular of a pump or a motor. According to a further embodiment, newly arriving frequencies in the detected sound wave range can be identified as an emergence of medium from one of the installation components. According to a further embodiment, lapsing of preceding detected frequencies in the detected sound wave range can be identified as a failure of one of the installation components, in particular a pump or a motor. According to a further embodiment, a change in the intensity and/or amplitude of the detected sound waves can be identified as an explosion and/or a misfire. According to a further embodiment, in the event of at least one of the predetermined threshold values being overshot and/or undershot, at least one message, at least one warning and/or at least one alarm can be output.

According to another embodiment, in an apparatus for determining a leak in at least one installation component and/or a state of at least one installation component of an installation, at least one optical recording unit for monitoring a subregion of one or more installation components being provided, one or more acoustic recording units can be arranged in the region of at least one of the installation components and can be used to detect, analyze and locate any noise emissions occurring, wherein the optical recording unit can be controlled in such a way that it additionally detects optically and analyzes acoustically located noise emission regions of the installation component in question.

According to a further embodiment of the apparatus, the at least one acoustic recording unit can be connected to an evaluation unit. According to a further embodiment of the apparatus, the acoustic recording unit can be a microphone. According to a further embodiment of the apparatus, the at least one optical recording unit can be connected to an evaluation unit. According to a further embodiment of the apparatus, the optical recording unit can be a camera. According to a further embodiment of the apparatus, the evaluation unit can be connected to at least one output unit. According to a further embodiment of the apparatus, the output unit can be a display, a loudspeaker and/or another suitable means.

BRIEF DESCRIPTION OF THE DRAWINGS

Exemplary embodiments will be explained in more detail with reference to a drawing.

FIG. 1 shows an apparatus for determining a leak in at least one installation component and/or a state of at least one of the installation components of an installation.

DETAILED DESCRIPTION

According to various embodiments, for determining a leak in at least one installation component and/or a state of at least one installation component of an installation, at least a sub-region of one or more installation components is monitored optically, wherein noise emissions occurring in at least one of the installation components are detected, analyzed and located and acoustically located noise emission regions of the installation component in question are additionally detected optically and analyzed.

By virtue of detecting and locating noise emissions occurring in the installation component and additionally optically detecting the acoustically located noise emission regions, automatic optical monitoring even of critical installation regions or installation components, i.e. installation regions or installation components which only have poor accessibility or are far removed, is made possible. This makes it possible to detect quickly and safely a leak and/or a state of at least one installation component even at locations in the installation which are not generally visually accessible. By virtue of directly aligning the optical recording unit with respect to the acoustically located, changed noise emission region, the user can immediately acquire an image of the situation in this installation region and take necessary measures for eliminating a detected leak and/or a faulty state of the installation component. In addition, further installation data, in particular installation data which are detected by measurement technology, such as pressure drop, changes in temperature, can be determined and used for determining the leak and/or the state of the installation component and assessed. Expediently, the acoustically and/or optically detected data, i.e. the detected noise emission data or the detected image data, are stored in a data store. This enables a subsequent search for and in particular temporal evaluation of detected noise emission data and image data for specific situations.

Expediently, the point of origin of the noise emissions is determined using analysis of at least one parameter of the noise emissions and is additionally detected optically and analyzed. In this case, at least one parameter of the noise emissions is detected and analyzed and used for adapting the optical detection of the acoustically located noise emission region.

Preferably, as parameter of the noise emissions, at least a frequency, a frequency band, an intensity and/or an amplitude of sound waves of the noise emissions are determined and analyzed. According to a further embodiment, changes in the at least one parameter of the sound waves are determined and analyzed. Preferably, as changes in the parameter, changes in a frequency, a frequency band, an intensity and/or an amplitude of the detected sound waves and/or at least a newly arriving frequency and/or frequency band and/or at least a lapsed frequency and/or frequency band is/are determined in the detected sound wave range.

In order to safely identify a risk region or a risk for the installation component, the detected changes in at least one of the parameters are monitored for an overshoot and/or undershoot of at least one predeterminable threshold value. If at least one predetermined threshold value is overshot or undershot, a critical situation may be present in the region of the installation component. In order to safely identify this, this identified critical risk region is additionally detected optically and evaluated.

As an alternative or in addition to the simple threshold value monitoring of one of the parameters of the sound waves, it is also possible for a time profile of changes in at least one parameter of the sound waves to be detected and monitored for an overshoot and/or undershoot of a predeterminable threshold value. It is thus possible, for example in the event of the occurrence of a determined rotation speed frequency, for the installation region which, as a result, is identified as a risk region to be detected optically and monitored for a predeterminable period of time. As an alternative or in addition, in the event of a possible risk situation being identified for this identified installation region, a message, a warning and/or an alarm can be output in tactile, acoustic and/or optical fashion.

For example, a detected change in the frequency band of the sound waves is identified as a change in a rotation speed of an installation component, in particular an assembly or a fitting, in particular a pump or a motor. In a further exemplary embodiment, newly arriving frequencies are identified as an emergence of medium, for example of bulk material, liquid or gas, from the installation component. Lapsing of preceding detected frequencies is preferably identified as a failure of an assembly, in particular a pump or a motor. A change in the intensity and/or amplitude of the sound waves is in particular identified as an explosion and/or a misfire.

Furthermore, further risk situations can be identified using correspondingly identified noise emissions which have been analyzed using stored threshold values and/or stored noise patterns.

As regards the apparatus for determining a leak in at least one installation component and/or a state of at least one installation component of an installation, at least one optical recording unit for monitoring a subregion of one or more installation components is provided, wherein one or more acoustic recording units is or are arranged in the region of at least one of the installation components and can be used to detect, analyze and locate any noise emissions occurring, wherein the optical recording unit can be controlled in such a way that it additionally detects optically and analyzes acoustically located noise emission regions of the installation component in question.

Expediently, the at least one acoustic recording unit and/or the optical recording unit are connected to an evaluation unit. As an alternative, the evaluation unit can be an integral part of the acoustic or optical recording unit.

Expediently, the acoustic recording unit is an acoustic pickup, in particular an acoustic transducer, for example a microphone. Another suitable means for recording the sound waves of the noise emissions can be provided which converts the detected sound waves into a usable electrical signal.

The optical recording unit is preferably a camera or another suitable apparatus, such as an infrared camera, a radar unit, an omnidirectional camera, a stereo camera, for example.

In order to output a message, a warning and/or an alarm as a function of the critical nature of the detected risk region, at least the evaluation unit is connected to at least one output unit. It is also possible for the optical and/or the acoustic recording unit to be connected to the output unit. Expediently, the output unit is a display, a loudspeaker and/or another suitable means. Preferably, the optical and/or acoustic recording unit, the evaluation unit and/or the output unit are connected to one another via a data transmission unit, for example a data bus, a radio link, a point-to-point link.

In this case, the single FIGURE shows an apparatus 1 for determining a leak in at least one installation component 2.1 to 2.n and/or a state of at least one of the installation components 2.1 to 2.n of an installation.

The installation is, for example, a gas, oil or chemical installation or a remote distribution or pumping station in a distribution network, which comprises, as installation components 2.1 to 2.n, a pipeline network 2.1, individual pipelines 2.2, fittings 2.3, such as pumps, valves, flaps, motors, a distribution unit 2.4, a vessel 2.5, such as tanks, etc. for delivering and/or storing at least one medium, such as bulk material, gas, a liquid, for example oil, water, etc.

In order to monitor one or more installation components 2.1 to 2.n or a subregion thereof or of the installation, at least one optical recording unit 3 is provided. The optical recording unit 3 is in the form of, for example, a camera, in particular an omnidirectional camera, a stereo camera, a radar unit, which has a predetermined detection range 4.

By means of the optical recording unit 3, subregions of the installation, in particular individual or a plurality of installation components 2.1 to 2.n are detected and are monitored, for example, for optical changes, such as, for example, an emergence of medium from one of the installation components 2.1 to 2.n, an explosion, intervention in one of the installation components 2.1 to 2.n by an unauthorized or authorized person. This can take place, for example, automatically via corresponding image processing of the image data detected by the optical recording unit 3 and/or by a user, for example personnel in an installation maintenance or installation management unit with display monitoring.

In addition, the apparatus 1 comprises, in the region of the installation components 2.1 to 2.n, in each case at least one or more acoustic recording units 5 with an associated recording range 10. In this case, the acoustic recording units 5 used are in particular acoustic transducers (also referred to as acoustic pickups or acoustic receivers), which convert sound waves into electrical signals, such as a microphone, for example, and/or a sound level meter, which comprises at least one acoustic transducer, a filter and an evaluation unit. Structure-borne noise microphones are used, for example, as microphones for monitoring pipelines 2.2, said structure-borne noise microphones being arranged directly on the pipeline 2.2 in question. As an alternative or in addition, the acoustic transducers or acoustic pickups can be connected indirectly to the installation component 2.1 to 2.n in question, with the result that the air-borne noise originating from the installation component 2.1 to 2.n can be measured. For this purpose, conventional microphones or so-called piezoelectric sensors can be used as acoustic recording units 5.

By means of the acoustic recording units 5, the sound waves emitted to the surrounding environment by a noise source, for example an emergence of medium at a leak, a fitting which is in operation, are detected. Specifically, the noise emissions occurring in the recording range 10 of the respective acoustic recording unit 5 are detected, analyzed and located. In this case, the acoustically located noise emission regions are used to control the optical recording unit 3 in such a way that it additionally detects optically and analyzes the acoustically located noise emission regions of the installation component 2.1 to 2.n in question.

In other words: if noise emission in an optically undetected installation region is identified by means of at least one of the acoustic recording units 5, the optical recording unit 3 is controlled correspondingly, in particular is moved in the direction in which the noise emission occurs, with the result that this noise emission region is additionally monitored optically. For this purpose, the optical recording unit 3 is capable of moving within at least one, preferably within at least three degrees of freedom. For example, the optical recording unit 3 can be rotated about its longitudinal axis and/or inclined along said axis. Also, the optical recording unit 3 can be moved in terms of its position, for example moved, for example rolled, forward, to the side, etc. For this purpose, the optical recording unit 3 is held or mounted correspondingly.

In order to safely identify and locate a noise emission, which in particular represents a critical situation, i.e. the detected noise signal makes it possible to conclude that there is a risk situation, at least one parameter of the noise emissions is determined and analyzed. Using the analysis of the at least one parameter of the noise emissions, the point of origin of the noise emission can be located and the optical recording unit 3 can be aligned correspondingly such that the point of origin can additionally be detected optically and analyzed.

In order to determine and analyze at least one parameter of the noise emissions, i.e. the sound waves emitted by the noise source, the acoustic recording units 5 are connected to an evaluation unit 6. In addition, the at least one optical recording unit 3 is likewise connected to the evaluation unit 6.

In the exemplary embodiment, the acoustic recording units 5 and the optical recording unit 3 are connected to the evaluation unit 6 via a wired link 9, for example a cable or a series data transmission unit. It is also possible for another suitable data transmission unit, in particular a wireless link, for example a radio link, to be used.

According to another embodiment, which is not illustrated in any more detail, the evaluation unit 6 can be integrated in one of the recording units 5 or in the optical recording unit 3, in which case the acoustic recording units 5 and the optical recording units 3 are connected to one another.

In order to monitor and output the detected image data of the optical recording unit 3 and in order to output messages, warnings and/or alarms in the event of a risk situation being identified, the evaluation unit 6 is connected to at least one output unit 7, for example via a data bus 8 or another suitable data transmission unit. By way of example, the output unit 7 is a display in an installation maintenance unit. It is also possible for the output unit 7 to be a loudspeaker or another suitable means. Expediently, the image data and the messages, warnings and/or alarms can be output optically and/or acoustically via suitable means.

During operation of the apparatus 1, at least one of the parameters of the noise emissions is detected by means of one or more of the acoustic recording units 5 and supplied for analysis to the evaluation unit 6. In this case, as parameter of the noise emissions, at least a frequency, a frequency band, an intensity and/or an amplitude of sound waves of the noise emissions are determined and analyzed. It is also possible for sound pressure levels, sound intensity levels and/or another suitable parameter of the detected sound waves to be analyzed by means of evaluation algorithms implemented in the evaluation unit 6 and/or filters.

Depending on the default setting, in this case the detected parameters can be analyzed using a threshold value comparison and monitored for an overshoot and/or undershoot of predetermined threshold values. If a predetermined threshold value is overshot and/or undershot, the optical recording unit 3 is controlled correspondingly, in particular moved.

In this case, in addition, using the determination of the overshoot and/or undershoot of one or more threshold values of one or more parameters by means of the evaluation unit 6 in combination with the detected image data from the optical recording unit 3 which is correspondingly aligned using the acoustic signals, for example, it is possible for an assessment of the critical nature of the situation at the point of origin of the noise emission to be implemented. This enables a differentiated evaluation and determination of the risk situation.

Furthermore, in the evaluation, in addition to the combination of acoustically and optically detected signals, it is also possible for signals from other sensors, such as pressure sensors, fill level sensors, for example, to be detected and taken into consideration. That is to say that the microphone and camera signals can be supplemented by further signals, such as pressure signals, fill level signals. This enables, for example, mutual verification of the signals detected in different ways for reliable and precise determination of the situation, in particular in order to determine whether a leak has occurred in one of the installation components 2.1 to 2.*n* or not.

In particular, mechanically driven installation components 2.3, such as a fitting, a pump, a drive motor, a valve, a flap, for example, can be investigated for characteristic noise developments and noise emissions associated with the mechanical drive and analyzed. Thus, by virtue of analysis of the corresponding sound waves, it is possible for a state, in particular possible wear, dry-running, cavitation, an imbalance of the installation component 2.3 to be identified.

As an alternative or in addition, in particular changes over time in one or more parameters of the sound waves, in particular one or more variable parameters can be determined and analyzed. As changes in one or more parameters, it is possible, for example, for changes in a frequency, a frequency band, an intensity, an amplitude to be determined. A newly arriving frequency and/or a newly arriving frequency band and/or at least one lapsed frequency and/or a lapsed frequency band in the detected sound wave range can also be determined.

According to a further embodiment, the detected changes in at least one of the parameters are also monitored for an overshoot and/or an undershoot of at least one predeterminable threshold value. In analogy to the simple parameter monitoring, this enables further evaluation of the critical nature of the detected acoustic signals and resultant control, in particular movement of the optical recording unit 3 and/or subsequent assessment of a possible risk situation.

In the text which follows, a few examples of evaluations and assessments of detected noise emissions by threshold value comparison and/or noise pattern comparison will be described in more detail.

Thus, for example, a detected change in the frequency band of the sound waves can be identified as a change in a rotation speed of an installation component 2.3, for example an assembly, in particular a pump or a motor.

Newly arriving frequencies in the detected sound wave range can be identified as an emergence of medium from the acoustically monitored installation component 2.1 to 2.*n*. A lapse in preceding detected frequencies in the detected sound wave range can be identified as a failure of one of the installation components 2.3, for example an assembly, in particular a pump or a motor, on the other hand.

An explosion and/or a misfire is identified, for example, on the basis of a change in the intensity and/or amplitude of the detected sound waves and an overshoot of maximum threshold values.

If one of the abovementioned acoustically determined critical situations is also identified by evaluation of the optically detected image data of the potential risk region, a control signal is passed to the output unit 7 by means of the evaluation unit 6, with the result that possibly at least a message, a warning and/or alarm can be output.

What is claimed is:

1. A method for determining at least one of a leak in at least one installation component and a state of at least one installation component of an installation, the method comprising:
   optically monitoring at least a subregion of one or more installation components, and
   detecting noise emissions occurring in or at at least one of the installation components,
   wherein the noise emissions are characterized by at least one parameter chosen from the group consisting of: a frequency, a frequency band, an intensity, and an amplitude of sound waves of the noise emissions;
   analyzing the at least one parameter of the noise emissions to locate an installation component; and
   conducting optical examination of the noise emission regions of the installation component in question.

2. The method according to claim 1, wherein at least one parameter of the noise emissions is detected and analyzed and used for adapting the optical detection of the acoustically located noise emission region.

3. The method according to claim 1, wherein changes in the at least one parameter of the sound waves are determined and analyzed.

4. The method according to claim 3, wherein at least one of: at least a newly arriving frequency, frequency band, at least a lapsed frequency, and frequency band is/are determined in the detected sound wave range.

5. The method according to claim 3, wherein detected changes in at least one of the parameters of the detected sound waves are monitored for at least one of an overshoot and undershoot of at least one predeterminable threshold value.

6. The method according to claim 3, wherein a time profile of changes in at least one parameter of the detected sound waves is determined and is monitored for at least one of an overshoot and undershoot of a predeterminable threshold value.

7. The method according to claim 3, wherein a detected change in the frequency band of the sound waves is identified as a change in a rotation speed of an installation component of a pump or a motor.

8. The method according to claim 3, wherein newly arriving frequencies in the detected sound wave range are identified as an emergence of medium from one of the installation components.

9. The method according to claim 3, wherein lapsing of preceding detected frequencies in the detected sound wave range is identified as a failure of one of the installation components or a pump or a motor.

10. The method according to claim 3, wherein at least one of a change in the intensity and amplitude of the detected sound waves is identified as at least one of an explosion and a misfire.

11. The method according to claim 3, comprising, in the event of at least one of the predetermined threshold values being at least one of overshot and undershot, outputting at least one of: at least one message, at least one warning and at least one alarm.

12. An apparatus for determining at least one of a leak in at least one installation component and a state of at least one installation component of an installation, the apparatus comprising:
   at least one optical recording unit for monitoring a subregion of one or more installation components being provided, one or more acoustic recording units arranged in the region of at least one of the installation components and operable to be used to detect any noise emissions occurring,
the one or more acoustic recording units in communication with an evaluation unit,
the evaluation unit characterizing the noise emissions by at least one parameter chosen from the group consisting of: a frequency, a frequency band, an intensity, and an amplitude of sound waves of the noise emissions; and
the evaluation unit analyzing the at least one parameter of the noise emissions to locate an installation component within the subregion;
wherein the optical recording unit detects optically and analyzes acoustically located noise emission regions of the installation component in question.

13. The apparatus according to claim 12, wherein the acoustic recording unit is a microphone.

14. The apparatus according to claim 12, wherein the optical recording unit is a camera.

15. The apparatus according to claim 12, further comprising the evaluation unit in communication with to at least one output unit.

16. The apparatus according to claim 15, wherein the output unit is at least one of a display, a loudspeaker and another suitable means.

* * * * *